United States Patent Office 3,342,741
Patented Sept. 19, 1967

3,342,741
THIOETHER SULFONATES
Emilios P. Antoniades, El Cerrito, Calif., assignor to Chevron Research Company, San Francisco, Calif., a corporation of Delaware
No Drawing. Filed Sept. 27, 1965, Ser. No. 490,649
1 Claim. (Cl. 252—152)

The present invention relates to the preparation of novel guanidinium 2-thioalkyl ethane sulfonates, and to compositions containing the same useful as detergents.

Guanidinium 2-mercaptoethane sulfonate is a known material. Its preparation is described, for example, by Schramm, Lemaire and Karlson (J. Am. Chem. Soc., 77, 6231 (1955)) and in U.S. Patent No. 2,695,310.

In general, this compound can be prepared by the following reactions:

$$BrCH_2CH_2Br + Na_2SO_3 \rightarrow BrCH_2CH_2SO_3Na + NaBr$$

$$BrCH_2CH_2SO_3Na + NH_2CSNH_2 \rightarrow$$
$$^+NHC(NH_2)SCH_2CH_2SO_3^- + NaBr$$
2-S-Thiouronium ethanesulfonate $$^+NHC(NH_2)SCH_2CH_2SO_3^- + NH_3 \rightarrow$$
$$HSCH_2CH_2SO_3^- C(NH_2)_3^+$$
Guanidinum 2-mercaptoethanesulfonate It has now been found that valuable novel derivatives can be made from the guanidinium 2-mercaptoethane sulfonate by a novel reaction involving the addition thereto of a straight-chain or branched-chain terminal olefin of 8 to 20, preferably 8 to 16, carbon atoms to give guanidinium 2-thioalkyl ethane sulfonate having 8 to 20, preferably 8 to 16, carbon atoms in the alkyl groups. These compounds can be represented by the formula $$(NH_2)_3^+ - CSO_3 - CH_2 - CH_2 - S - (CH_2)_xCH_3$$

wherein $x$ is an integer of 7 to 19.

The products so produced are resistant to alkaline hydrolysis, and can be formulated into detergent compositions having good detersive properties, which upon use are productive of a highly dense and wet foam of good stability and excellent quality.

In accordance with the invention, 2-thioalkyl ethane sulfonates of 8 to 20 carbon atoms in the alkyl groups are prepared by a process which comprises adding a $C_8$–$C_{20}$ 1-olefin to guanidinium 2-mercaptoethane sulfonate. The addition is accomplished by subjecting in the presence of a solvent approximately equimolar proportions of the guanidinium 2-mercaptoethane sulfonate and 1-olefin, to a temperature as low as about 30° C. and, generally, not above about 150° C. In general the reaction is complete over a period of ½ to 3 hours, longer reaction times being required at temperatures near the lower end of the specified temperature range, and shorter reaction times at temperatures near the upper end of the specified temperature range. As stated, the proportions of the guanidinium compound and of the 1-olefin are approximately equimolar. However, an excess of 1-olefin can be used, and unreacted 1-olefin can be removed at the end of the reaction by stripping or de-oiling.

Following reaction the desired product can be isolated by simple evaporation of the solvent or by salting out, i.e., by adding a non-polar solvent such as heptane, followed by phase separation or filtration.

The solvents that may be used are generally polar liquids in which the reagents have some mutual solubility. Examples of suitable solvents are dimethyl formamide, dimethyl sulfoxide, and low molecular weight alcohols, e.g., methanol, ethanol, 2-propanol, and 1-butanol. The amount of solvent is not critical, an amount sufficient to dissolve the guanidinium 2-mercaptoethane sulfonate being satisfactory.

The 1-olefin reactant can be obtained by well-known processes, such as the cracking of paraffin or petroleum waxes, and the polymerization of lower olefin, such as ethylene, or dimerization of a lower olefin.

The following examples illustrate the practice of the invention:

EXAMPLE 1

4.2 parts of guanidinium 2-mercaptoethane sulfonate were dissolved in 40 parts of methanol containing 5.0 parts of 1-dodecene. The resulting solution was warmed at 60° C. for about 45 minutes. After evaporation of the solvent, and a pentane wash of the residue, 7.4 parts (96% yield) of a white crystalline solid were obtained. Recrystallization from water gave a material having a M.P. of 147–148° C. Analysis of $C_{15}H_{35}S_2O_3N_3$ gave a nitrogen content of 11.22% (calculated, 11.37%). Infrared analysis showed adsorption at the following wave numbers (cm.$^{-1}$): 1670, ($>$C=N); 1250–1130; 1050 ($-SO_3-$).

EXAMPLE 2

About 2 parts of propylene tetramer having a boiling point range of 346–453° F. and an average molecular weight of 172 were dissolved in 4 parts of n-butanol. To this was added 1 part of guanidinium 2-mercaptoethane sulfonate. The solution was heated at reflux for 4 hours. At the end of this time the n-butanol was removed and 100 ml. of water was added. Unreacted olefin was removed by extraction with pentane. Hyamine analysis[1] of the aqueous layer showed an 8% yield of surface active material based on the olefin.

Example 2 illustrates that the reaction is specific to olefins in which the double bond is in terminal position. Much of propylene tetramer is characterized by having an internal double bond; hence, the low yield of surface active material in this example. Because the reaction is specific to terminal double bonds, it is possible to treat mixtures of terminal and internal olefins thereby to convert the terminal olefin to water-soluble materials that can then be separated from the water-insoluble, unreacted internal olefins, as indicated in Example 2.

EXAMPLE 3

The propylene tetramer of Example 2 was subjected to the conditions of the oxo reaction, followed by catalytic dehydration to give an olefin having a boiling point range of 64 to 70° C. at 0.3 mm. Hg of pressure, and an average molecular weight of 179. The olefin had a bromine number of 89.8. It was reacted with guanidinium 2-mercaptoethane sulfonate by the method of Example 1. The aqueous product contained 53% yield of surface active material based on olefin.

EXAMPLE 4

Example 1 was repeated using a nonene, derived as in Example 3 from the oxo alcohol of diisobutylene, having a boiling point range of 118 to 120° C. Hyamine analysis of the reaction mixture showed 68% yield of surface active material based on olefin.

EXAMPLE 5

About 1.7 parts of 2-butyl-1-octene and 2 parts of guanidinium 2-mercaptoethane sulfonate were dissolved in 8 parts of methanol. This solution was maintained at 65° C. for 2 hours. Hyamine titration of an aliquot showed a 60% molecular conversion to surface active material.

---
[1] R. L. House and J. L. Darragh, Anal. Chem., 26, 1492–7 (1954).

As indicated, it has been found that the novel compounds of the invention are good detergent materials; they are particularly outstanding in foam properties. Therefore, in a most useful embodiment of the invention, the compounds of the present invention can be compounded or formulated into particulate solid detergent compositions with conventional water-soluble inorganic salt detergent builders, or fillers, including polyphosphates such as sodium tripolyphosphate, tetrasodium pyrophosphate, alkali metal sulfates, sodium silicate, alkali metal carbonates and the like. Other conventional additives to detergent formulations can be employed. These include anticaking agents, foam boosters, optical bleaches, extenders and preventives of soil redeposition (e.g., carboxymethyl cellulose or derivatives of oxidized cellulose), skin emollients and anti-irritants, perfume and coloring matter.

In general, suitable formulations can contain 10 to 40% by weight of the total composition of detergent active guanidinium 2-thioalkoxyethanesulfonate and 60 to 90% by weight of the total composition of water-soluble inorganic detergent salt builder.

Detergent compositions as thus prepared have good foam characteristics. The tests used for determining the foam qualities are as follows:

An aqueous solution containing 0.15% of the total formulation and at an initial temperature of 120° F. is stirred at 600–800 r.p.m. for 1 minute. Measurements are made of foam height after 1 and 15 minutes of standing. The stability of the foam toward mechanical disturbance is determined by impinging a soft jet of air onto the foam head and observing the decrease in foam volume, the breakdown of bubbles, and the general ability to resist degradation. The results are compared with the same two standards, and rated accordingly. The quality, that is denseness of the foam, is rated from 1 (lowest quality) to 5 (highest quality).

Detersive properties were determined by the Terg-O-Tometer test, using Foster D. Snell soiled cotton, as described in Detergency Evaluation and Testing by J. C. Harris, Interscience Manual 4, Interscience Publishers, Inc., New York. The test results are given as percent soil removal as determined by reflectance measurements on the original cotton swatches, the soiled cotton swatches, and the washed cotton swatches.

EXAMPLE 6

The product from Example 1, 154 parts was mixed with 375 parts of sodium tripolyphosphate, 38 parts of sodium silicate, 7.5 parts of carboxymethyl cellulose, and 162 parts of sodium sulfate, and 15 parts of cetyl alcohol.

The resulting mixture, as well as two commercial built detergents, was subjeced to the bench foam tests as described above.

| Compound | Foam Height (mm.) After— | | Stability | Quality |
| --- | --- | --- | --- | --- |
| | 1 min. | 15 min. | | |
| Commercial A | 42 | 33 | Excellent | 4 |
| Commercial B | 79 | 31 | Poor | 1 |
| Example 6 | 52 | 25 | Good | *5 |

* Very wet and very dense like a shaving cream foam.

The mixture of Example 6 was tested at a concentration of 0.20% in 50 and 180 p.p.m. hard water [2] by the Terg-O-Tometer method, previously described, and gave values of 47% and 49% soil removal, respectively.

Hydrolytic stability was tested by measuring the concentration of surfactant (hyamine) before and after refluxing a 0.12% solution in 0.05 N sodium hydroxide for 6 days. With the product from Example 1 less than 1% decrease in activity was observed, indicating a high degree of stability.

I claim:

A detergent composition consisting essentially by weight of 10 to 40% of a water-soluble guanidinium 2-thioalkoxyethanesulfonate having 8–20 carbon atoms in the alkyl groups, and 60 to 90% of water-soluble inorganic salt detergent builders.

References Cited

UNITED STATES PATENTS 2,695,310  11/1954  Schramm et al. _____ 260—501

LEON D. ROSDOL, *Primary Examiner.*

S. E. DARDEN, *Examiner.*

[2] Hardness is expressed in parts per million (p.p.m.) of a mixture of ⅔ calcium carbonate and ⅓ magnesium carbonate in water.